United States Patent
Kopikare et al.

(10) Patent No.: US 9,308,455 B1
(45) Date of Patent: Apr. 12, 2016

(54) SYSTEM AND METHOD FOR GAMING IN AN AD-HOC NETWORK

(75) Inventors: Rahul Kopikare, Livermore, CA (US); Milind Kopikare, San Jose, CA (US); Paramesh Gopi, Cupertino, CA (US); Aswath Mohan, San Jose, CA (US); Partho Mishra, Cupertino, CA (US)

(73) Assignee: Marvell International Ltd. (BM)

( * ) Notice: Subject to any disclaimer, the term of this patent is extended or adjusted under 35 U.S.C. 154(b) by 1356 days.

(21) Appl. No.: 11/924,431

(22) Filed: Oct. 25, 2007

Related U.S. Application Data (60) Provisional application No. 60/862,898, filed on Oct. 25, 2006.

(51) Int. Cl.
| | |
|---|---|
| G06F 15/16 | (2006.01) |
| A63F 13/00 | (2014.01) |
| G06F 17/00 | (2006.01) |
| G06F 19/00 | (2011.01) |
| A63F 13/48 | (2014.01) |

(52) U.S. Cl.
CPC .................................... A63F 13/48 (2014.09)

(58) Field of Classification Search
USPC ............................................ 709/205; 463/42
See application file for complete search history.

(56) References Cited

U.S. PATENT DOCUMENTS

| | | | |
|---|---|---|---|
| 4,959,847 A | 9/1990 | Engelke et al. | |
| 5,488,693 A | 1/1996 | Houck et al. | |
| 5,738,583 A * | 4/1998 | Comas et al. | 463/40 |
| 5,850,592 A | 12/1998 | Ramanathan | |
| 5,877,701 A | 3/1999 | Nagakura | |
| 6,272,120 B1 | 8/2001 | Alexander | |
| 6,309,301 B1 * | 10/2001 | Sano | 463/35 |
| 6,315,668 B1 * | 11/2001 | Metke et al. | 463/42 |
| 6,453,181 B1 | 9/2002 | Challa et al. | |
| 6,524,189 B1 * | 2/2003 | Rautila | 463/40 |
| 6,590,928 B1 | 7/2003 | Haartsen | |
| 6,600,726 B1 | 7/2003 | Nevo et al. | |
| 6,662,229 B2 | 12/2003 | Passman et al. | |
| 6,690,935 B1 | 2/2004 | Calot et al. | |

(Continued)

FOREIGN PATENT DOCUMENTS

| | | |
|---|---|---|
| CN | 1375772 A | 10/2002 |
| CN | 1522503 A | 8/2004 |

(Continued)

OTHER PUBLICATIONS

Lety, Emmanuel, Laurent Gautier, and Christophe Diot. "Mimaze, a 3d multi-player game on the internet." Proc. of 4th International Conference on VSMM (Virtual Systems and MultiMedia), Gifu, Japan. 1998.*

(Continued)

*Primary Examiner* — Shirley Zhang (57) ABSTRACT

A method of mobile gaming is disclosed. The method includes configuring a mobile device to include a plurality of gaming parameters representative of a game to be played, communicating a gaming request via a wireless network, wherein the gaming request includes a game identifier. The method further includes detecting a gaming request response, wherein the gaming request response is associated with the game identifier, exchanging at least one of the plurality of gaming parameters, and updating at least one of the plurality of gaming parameters on the mobile device to reflect the exchanged at least one of the plurality of gaming parameters.

21 Claims, 6 Drawing Sheets

(56) References Cited

U.S. PATENT DOCUMENTS

| | | | |
|---|---|---|---|
| 6,704,866 B1 | 3/2004 | Benayoun et al. | |
| 6,707,801 B2 | 3/2004 | Hsu | |
| 6,760,587 B2 | 7/2004 | Holtzman et al. | |
| 6,785,892 B1 | 8/2004 | Miller | |
| 6,788,675 B1 | 9/2004 | Yang | |
| 6,793,580 B2 | 9/2004 | Sinclair et al. | |
| 6,795,701 B1 | 9/2004 | Baker et al. | |
| 6,799,056 B2 | 9/2004 | Curley et al. | |
| 6,859,460 B1 | 2/2005 | Chen | |
| 6,879,570 B1 | 4/2005 | Choi | |
| 6,879,574 B2 | 4/2005 | Naghian et al. | |
| 6,879,812 B2 | 4/2005 | Agrawal et al. | |
| 6,909,705 B1 | 6/2005 | Lee et al. | |
| 6,932,698 B2 | 8/2005 | Sprogis | |
| 6,975,613 B1 | 12/2005 | Johansson | |
| 6,980,522 B2 | 12/2005 | Boyle | |
| 7,013,391 B2 | 3/2006 | Herle et al. | |
| 7,072,323 B2 | 7/2006 | Roberts et al. | |
| 7,073,129 B1 | 7/2006 | Robarts et al. | |
| 7,095,732 B1 | 8/2006 | Watson, Jr. | |
| 7,097,562 B2 | 8/2006 | Gagner | |
| 7,110,366 B2 | 9/2006 | Hulyalkar et al. | |
| 7,120,129 B2 | 10/2006 | Ayyagari | |
| 7,120,456 B1 | 10/2006 | Elliot et al. | |
| 7,158,798 B2 | 1/2007 | Lee et al. | |
| 7,181,544 B2 | 2/2007 | Vangal et al. | |
| 7,190,961 B2 | 3/2007 | Burr | |
| 7,224,964 B2 | 5/2007 | Souissi et al. | |
| 7,236,772 B1 | 6/2007 | Botzas | |
| 7,251,235 B2 | 7/2007 | Wentink | |
| 7,257,721 B2 | 8/2007 | Chung et al. | |
| 7,324,444 B1 | 1/2008 | Liang et al. | |
| 7,347,781 B2 | 3/2008 | Schultz | |
| 7,400,722 B2 | 7/2008 | Qi et al. | |
| 7,435,179 B1 | 10/2008 | Ford | |
| 7,440,430 B1 | 10/2008 | Jagadeesan et al. | |
| 7,452,278 B2 | 11/2008 | Chen et al. | |
| 7,457,271 B2* | 11/2008 | Donovan | 370/338 |
| 7,496,065 B2 | 2/2009 | Anjum et al. | |
| 7,505,795 B1 | 3/2009 | Lim et al. | |
| 7,515,897 B2 | 4/2009 | Suzuki | |
| 7,616,588 B2 | 11/2009 | Gatta | |
| 7,729,661 B2 | 6/2010 | Tanaka et al. | |
| 7,733,861 B2 | 6/2010 | Suga | |
| 7,899,017 B2 | 3/2011 | Yu et al. | |
| 7,978,647 B2 | 7/2011 | Anjum et al. | |
| 7,990,903 B2* | 8/2011 | Nishihara et al. | 370/312 |
| 8,073,923 B2 | 12/2011 | Sasaki et al. | |
| 8,180,363 B2* | 5/2012 | Maekawa et al. | 455/454 |
| 8,321,587 B2* | 11/2012 | Burr | 709/238 |
| 2001/0055950 A1 | 12/2001 | Davies et al. | |
| 2002/0013784 A1 | 1/2002 | Swanson | |
| 2002/0061743 A1* | 5/2002 | Hutcheson et al. | 455/426 |
| 2002/0091790 A1 | 7/2002 | Cubley | |
| 2002/0103019 A1* | 8/2002 | Emmerson | 463/16 |
| 2002/0107985 A1 | 8/2002 | Hwang et al. | |
| 2002/0147044 A1* | 10/2002 | Jakobsson et al. | 463/42 |
| 2002/0151366 A1 | 10/2002 | Walker et al. | |
| 2002/0159401 A1 | 10/2002 | Boger | |
| 2002/0176366 A1 | 11/2002 | Ayyagari et al. | |
| 2002/0191561 A1 | 12/2002 | Chen et al. | |
| 2002/0191573 A1 | 12/2002 | Whitehill et al. | |
| 2002/0199124 A1 | 12/2002 | Adkisson | |
| 2003/0023761 A1 | 1/2003 | Jeansonne et al. | |
| 2003/0041150 A1 | 2/2003 | Passman et al. | |
| 2003/0069018 A1 | 4/2003 | Matta et al. | |
| 2003/0078062 A1 | 4/2003 | Burr | |
| 2003/0084337 A1 | 5/2003 | Simionescu et al. | |
| 2003/0099212 A1 | 5/2003 | Anjum et al. | |
| 2003/0163579 A1 | 8/2003 | Knauerhase et al. | |
| 2003/0182454 A1 | 9/2003 | Huth et al. | |
| 2003/0224855 A1 | 12/2003 | Cunningham | |
| 2003/0231189 A1 | 12/2003 | Williams | |
| 2003/0231625 A1 | 12/2003 | Calvignac | |
| 2004/0066751 A1 | 4/2004 | Tseng et al. | |
| 2004/0078372 A1 | 4/2004 | Huuskonen | |
| 2004/0081110 A1 | 4/2004 | Koskimies | |
| 2004/0082383 A1 | 4/2004 | Muncaster et al. | |
| 2004/0105415 A1 | 6/2004 | Fujiwara et al. | |
| 2004/0110563 A1 | 6/2004 | Tanaka et al. | |
| 2004/0127277 A1 | 7/2004 | Walker et al. | |
| 2004/0127289 A1* | 7/2004 | Davis et al. | 463/42 |
| 2004/0139159 A1* | 7/2004 | Ricciardi et al. | 709/205 |
| 2004/0146022 A1 | 7/2004 | Lewis et al. | |
| 2004/0174829 A1 | 9/2004 | Ayyagari | |
| 2004/0185851 A1 | 9/2004 | Nagai | |
| 2004/0196808 A1 | 10/2004 | Chaskar et al. | |
| 2004/0259542 A1 | 12/2004 | Vitamaki et al. | |
| 2005/0032577 A1 | 2/2005 | Blackburn et al. | |
| 2005/0041660 A1 | 2/2005 | Pennee et al. | |
| 2005/0073980 A1 | 4/2005 | Thomson et al. | |
| 2005/0088980 A1* | 4/2005 | Olkkonen et al. | 370/255 |
| 2005/0099977 A1 | 5/2005 | Williams et al. | |
| 2005/0122940 A1* | 6/2005 | Nian | 370/338 |
| 2005/0129055 A1 | 6/2005 | Hall et al. | |
| 2005/0138462 A1 | 6/2005 | Hunt et al. | |
| 2005/0157661 A1 | 7/2005 | Cho | |
| 2005/0177639 A1 | 8/2005 | Reunamaki et al. | |
| 2005/0181872 A1 | 8/2005 | Acharya et al. | |
| 2005/0197189 A1 | 9/2005 | Schultz | |
| 2005/0221897 A1* | 10/2005 | Oe | 463/42 |
| 2005/0250487 A1 | 11/2005 | Miwa et al. | |
| 2005/0250497 A1 | 11/2005 | Ghosh et al. | |
| 2005/0268003 A1 | 12/2005 | Wang et al. | |
| 2005/0268151 A1 | 12/2005 | Hunt et al. | |
| 2005/0286456 A1 | 12/2005 | McNew et al. | |
| 2005/0286464 A1* | 12/2005 | Saadawi et al. | 370/328 |
| 2005/0286480 A1 | 12/2005 | Akiyama | |
| 2006/0013160 A1* | 1/2006 | Haartsen | 370/328 |
| 2006/0039341 A1 | 2/2006 | Ptasinski et al. | |
| 2006/0041750 A1 | 2/2006 | Carter et al. | |
| 2006/0045138 A1 | 3/2006 | Black et al. | |
| 2006/0046709 A1 | 3/2006 | Krumm et al. | |
| 2006/0056378 A1 | 3/2006 | Sugaya | |
| 2006/0062220 A1 | 3/2006 | Suga | |
| 2006/0095290 A1 | 5/2006 | Chernev | |
| 2006/0106963 A1 | 5/2006 | Sasaki et al. | |
| 2006/0135261 A1* | 6/2006 | Kinne et al. | 463/42 |
| 2006/0135262 A1 | 6/2006 | Kennedy et al. | |
| 2006/0153156 A1 | 7/2006 | Wentink et al. | |
| 2006/0154710 A1* | 7/2006 | Serafat | 463/1 |
| 2006/0166740 A1 | 7/2006 | Sufuentes | |
| 2006/0179322 A1 | 8/2006 | Bennett et al. | |
| 2006/0205409 A1 | 9/2006 | Chiou et al. | |
| 2006/0221856 A1 | 10/2006 | Quiroz | |
| 2006/0221858 A1 | 10/2006 | Switzer et al. | |
| 2006/0221915 A1 | 10/2006 | Gatta et al. | |
| 2006/0246947 A1 | 11/2006 | Fujii et al. | |
| 2006/0251004 A1 | 11/2006 | Zhong et al. | |
| 2006/0259632 A1 | 11/2006 | Crawford et al. | |
| 2006/0282541 A1 | 12/2006 | Hiroki | |
| 2006/0287099 A1* | 12/2006 | Shaw et al. | 463/42 |
| 2007/0030116 A1 | 2/2007 | Feher | |
| 2007/0030824 A1 | 2/2007 | Ribaudo et al. | |
| 2007/0047547 A1 | 3/2007 | Conner et al. | |
| 2007/0060355 A1 | 3/2007 | Amaitis et al. | |
| 2007/0060358 A1 | 3/2007 | Amaitis et al. | |
| 2007/0076683 A1 | 4/2007 | Chung | |
| 2007/0086394 A1 | 4/2007 | Yamada et al. | |
| 2007/0086424 A1 | 4/2007 | Calcev et al. | |
| 2007/0099703 A1 | 5/2007 | Terebilo | |
| 2007/0105548 A1 | 5/2007 | Mohan et al. | |
| 2007/0141988 A1 | 6/2007 | Huehnel et al. | |
| 2007/0147317 A1 | 6/2007 | Smith et al. | |
| 2007/0155505 A1* | 7/2007 | Huomo | 463/42 |
| 2007/0171882 A1 | 7/2007 | Lee | |
| 2007/0190494 A1 | 8/2007 | Rosenberg | |
| 2007/0202890 A1 | 8/2007 | Feher | |
| 2007/0202910 A1 | 8/2007 | Brewer et al. | |
| 2007/0265018 A1 | 11/2007 | Feher | |
| 2007/0291761 A1 | 12/2007 | Kauniskangas et al. | |
| 2008/0013487 A1 | 1/2008 | Molteni et al. | |
| 2008/0019522 A1 | 1/2008 | Proctor | |
| 2008/0037444 A1 | 2/2008 | Chhabra | |

(56) References Cited

U.S. PATENT DOCUMENTS

| | | | |
|---|---|---|---|
| 2008/0037495 A1 | 2/2008 | Anjum et al. | |
| 2008/0039015 A1 | 2/2008 | Nakata et al. | |
| 2008/0043868 A1 | 2/2008 | Feher | |
| 2008/0069105 A1 | 3/2008 | Costa et al. | |
| 2008/0095112 A1 | 4/2008 | Wiemann et al. | |
| 2008/0096662 A1* | 4/2008 | Kuwahara et al. | 463/41 |
| 2008/0108437 A1 | 5/2008 | Kaarela et al. | |
| 2008/0146337 A1* | 6/2008 | Halonen et al. | 463/42 |
| 2008/0146343 A1 | 6/2008 | Sullivan et al. | |
| 2008/0164984 A1 | 7/2008 | Sheffer | |
| 2008/0167865 A1 | 7/2008 | Yamanashi et al. | |
| 2008/0172491 A1 | 7/2008 | Chhabra et al. | |
| 2008/0220878 A1* | 9/2008 | Michaelis | 463/42 |
| 2009/0011834 A1 | 1/2009 | Chhabra | |
| 2009/0048024 A1 | 2/2009 | Tanaka et al. | |
| 2009/0092060 A1 | 4/2009 | Goto | |
| 2009/0180441 A1 | 7/2009 | Ikeda | |
| 2009/0191878 A1 | 7/2009 | Hedqvist et al. | |
| 2009/0210531 A1 | 8/2009 | Melnikov | |
| 2009/0279506 A1 | 11/2009 | Sinnreich et al. | |
| 2010/0087240 A1* | 4/2010 | Egozy et al. | 463/7 |
| 2010/0278077 A1 | 11/2010 | Reunamäki et al. | |
| 2012/0072485 A1* | 3/2012 | Hutcheson et al. | 709/203 |
| 2012/0329554 A1* | 12/2012 | Mgrdechian et al. | 463/29 |

FOREIGN PATENT DOCUMENTS

| | | |
|---|---|---|
| CN | 1842000 A | 10/2006 |
| EP | 1622319 | 5/2004 |
| JP | 2004-136009 | 10/2002 |
| JP | 2004-141225 | 10/2002 |
| JP | 2003-289277 | 10/2003 |
| JP | 2004-135778 | 5/2004 |
| JP | 2006-086959 | 9/2004 |
| JP | 2006-50020 | 2/2006 |
| JP | 2006-148448 | 6/2006 |
| JP | 2006-148488 | 6/2006 |
| WO | WO 03/003610 A1 | 1/2003 |
| WO | WO 2004/062198 | 7/2004 |
| WO | WO 2005/011203 A1 | 2/2005 |
| WO | WO 2005/076543 | 8/2005 |

OTHER PUBLICATIONS

Zander, Sebastian et al., "Achieving Fairness in Multiplayer Network Games through Automated Latency Balancing," ACE 2005, Proceedings of the 2005 ACM SIGCHI International Conference on Advances in computer entertainment technology, pp. 117-124.*
U.S. Appl. No. 60/862,898, filed Oct. 25, 2006.
U.S. Appl. No. 11/867,665, filed Oct. 4, 2007.
U.S. Appl. No. 11/867,661, filed Oct. 4, 2007.
IEEE Computer Society, IEEE Standard for Information Technology, Part 11 Wireless LAN Medium Access Control (MAC) and Physical Layer (PHY) specification, Amendment 2: Higher-speed Physical Layer (PHY) extension in the 2.4 GHz band, Corrigendum 1, 23 pgs, Nov. 7, 2001.
IEEE P802.11g/D8.2, Draft Supplement to Standard [for] Information Technology, Telecommunication and information exchange between systems, Local and metropolitan area networks-Specific requirements, Part 11: Wireless LAN Medium Access Control (MAC) and Physical Layer (PHY) specifications: Further Higher Data Rate Extension in the 2.4 Ghz Band, 69 pgs, Apr. 2003.
802.11h, IEEE Standard for Information technology, Telecommunications and Information exchange between systems, Local and metropolitan area network, Specific requirements, Part 11: Wireless LAN Medium Access Control (MAC) and Physical Layer (PHY) specifications, Amendment 5: Spectrum and Transmit Power Management Extensions in the GHz band in Europe, 75 pgs., Oct. 14, 2003.
802.11i, IEEE Standard for Information technology, Telecommunication and information exchange between systems, Local and metropolitan area networks, Specific requirements, Part 11 Wireless LAN Medium Access Control (MAC) and Physical Layer (PHY) specifications, Amendment 6, Medium Access Control (MAC) Security Enhancements, 190 pgs., Jul. 23, 2004.
Doc.: IEEE 802.11-04/0889r6, IEEE P802.11 Wireless LANs, TGn Sync Proposal Technical Specifications, Syed Aon Mujitaba, Agere Systems, 131 pgs., May 2005.
IEEE Std. 802.11a-1999, Supplemental to IEEE Standard for Information technology, Telecommunications and information exchange between systems, Local and metropolitan area networks, Part 11: Wireless LAN Medium Access Control (MAC) and Physical Layer (PHY) specifications: High-speed Physical Layer in the 5 GHZ Band, 91 pgs., Sep. 16, 1999.
IEEE Std 802.11b-1999, Supplement to IEEE Standard for Information technology, Telecommunication and information exchange between systems, Part 11: Wireless LAN Medium Access Control (MAC) and Physical Layer (PHY) specifications: Higher-Speed Physical Layer Extension in the 2.4 GHz Band, 96 pgs., Sep. 16, 1999.
IEEE P802.11e/D11.0, IEEE Standard for information technology, Part 11 Wireless Medium Access Control (MAC) and Physical Layer (PHY) specifications: Amendment 7: Medium Access Control (MAC) Quality of Service (QoS) Enhancements, 195 pgs., Oct. 2004.
"Part 11: Wireless LAN Medium Access Control (MAC) and Physical Layer (PHY) specifications, Amendment 2: Higher-speed Physical Layer (PHY) extension in the 2.4 GHz band," IEEE Std 802.11b-1999/Cor 1-2001, New York, NY, Nov. 7, 2001, Downloaded from the Internet, 23 pages.
"Part 11: Wireless LAN Medium Access Control (MAC) and Physical Layer (PHY) specifications, Amendment 5: Spectrum and Transmit Power Management Extensions in the 5 GHz band in Europe," IEEE Std 802.11h-2003, New York, NY, Oct. 14, 2003, Downloaded from the Internet, 75 pages.
"Part 11: Wireless LAN Medium Access Control (MAC) and Physical Layer (PHY) specifications, Amendment 6: Medium Access Control (MAC) Security Enhancements," IEEE Std 802.11i-2004, New York, NY, Jul. 23, 2004, Downloaded from the Internet, 190 pages.
"Part 11: Wireless LAN Medium Access Control (MAC) and Physical Layer (PHY) specifications, Amendment 7: Medium Access Control (MAC) Quality of Service (QoS) Enhancements," IEEE P802.11e/D11.0, New York, NY, Oct. 2004, Downloaded from the Internet, 195 pages.
"Part 11: Wireless LAN Medium Access Control (MAC) and Physical Layer (PHY) specifications: Further Higher Data Rate Extension in the 2.4 GHz Band," IEEE P802.11g/D8.2, New York, NY, Apr. 2003, Downloaded from the Internet, 69 pages.
"Part 11: Wireless LAN Medium Access Control (MAC) and Physical Layer (PHY) specifications: High-speed Physical Layer in the 5 GHZ Band," IEEE Std 802.11a-1999, New York, NY, Dec. 30, 1999, Downloaded from the Internet, 91 pages.
"Part 11: Wireless LAN Medium Access Control (MAC) and Physical Layer (PHY) specifications: Higher-Speed Physical Layer Extension in the 2.4 GHz Band," IEEE Std 802.11b-1999, New York, NY, Jan. 20, 2000, Downloaded from the Internet, 96 pages.
"TGn Sync Proposal Technical Specification-Abstract," IEEE 802.11-04/0889r6, Mujtaba, Syed Aon, Agere Systems, Allentown, PA, May 18, 2005, Downloaded from the Internet, 131 pages.
U.S. Appl. No. 11/867,665, "Power Save Mechanisms for Dynamic Ad-Hoc Networks," Kopikare et al., filed Oct. 4, 2007.
Lortz et al., "Wi-Fi Simple Config Specification," Wi-Fi Alliance Confidential, Version 1.0a, Feb. 10, 2006.
International Search Report for PCT Application No. PCT/US2007/080733 mailed Sep. 9, 2008.
Written Opinion for PCT Application No. PCT/US200708733 mailed Sep. 9, 2008.
International Search Report for PCT Application No. PCT/US07/17529 mailed Oct. 1, 2008.
Written Opinion of the International Searching Authority for PCT Application No. PCT/US07/17529 mailed Oct. 1, 2008.
Notification Concerning Transmittal of International Preliminary Report on Patentability for PCT Application No. PCT/US2007/080733 mailed Apr. 30, 2009.
Chinese Office Action issued in Chinese Application No. 200780038678.7 mailed Sep. 13, 2010.

(56) References Cited

OTHER PUBLICATIONS

Chinese Office Action for Application No. 200780037626.8 dated Jul. 8, 2011.
Office Action issued in U.S. Appl. No. 11/800,166 mailed Jun. 25, 2009.
Office Action issued in U.S. Appl. No. 11/800,166 mailed Feb. 24, 2010.
Office Action issued in U.S. Appl. No. 11/800,166 mailed Aug. 19, 2010.
Office Action issued in U.S. Appl. No. 11/800,166 mailed Mar. 29, 2011.
Office Action issued in U.S. Appl. No. 11/867,665 mailed Nov. 23, 2010.
Notice of Allowance issued in U.S. Appl. No. 11/867,665 mailed Feb. 28, 2011.
Office Action issued in U.S. Appl. No. 11/867,661 mailed Sep. 15, 2009.
Office Action issued in U.S. Appl. No. 11/867,661 mailed Mar. 26, 2010.
Office Action issued in U.S. Appl. No. 11/867,661 mailed Nov. 1, 2010.
Non-Final Office Action dated May 23, 2012 cited in related U.S. Appl. No. 12/167,804.
Chinese Office Action for Application No. 2007800386787 dated Oct. 18, 2011.
Office Action issued in U.S. Appl. No. 12/167,804 dated Dec. 22, 2011.
Office Action issued in U.S. Appl. No. 12/167,804 dated Sep. 2, 2011.
Office Action issued in U.S. Appl. No. 11/542,393 dated Apr. 9, 2010.
Office Action issued in U.S. Appl. No. 11/542,393 dated Aug. 5, 2010.
Office Action issued in U.S. Appl. No. 11/542,393 dated Apr. 13, 2011.
Office Action issued in U.S. Appl. No. 11/542,393 dated Nov. 9, 2009.
Office Action issued in U.S. Appl. No. 11/800,166 dated Nov. 3, 2011.
Hirano Aya, "Introductory Techniques for Current Wireless LAN," Nikkei network vol. 67, Japan Nikkei BP, Nikkei Business Publications, Inc., 2005, (see also English translation of Summary of Japanese Office Action dated Nov. 29, 2011).
Japanese Office Action dated Nov. 29, 2011 for Japanese Patent Application No. 2009-523819, including English translation of Summary of Japanese Office Action.
Office Action for Japanese Patent Application No. 2009-532521 dated Jan. 15, 2013 (5 pgs).
Office Action for U.S. Appl. No. 11/867,661 dated Mar. 11, 2013 (16 pgs).
The Institute of Electrical and Electronics Engineers, Inc., "Further Higher-Speed Physical Layer Extension in the 2.4 GHz Band," IEEE Draft Std 802.11g-2002, New York, NY, May 2002, 47 pages.
U.S. Appl. No. 11/800,166, "Ad-Hoc Simple Configuration," Kapil Chhabra, filed May 4, 2007, 34 pages.
U.S. Appl. No. 12/167,804, "Location Aware Ad-Hoc Gaming,"Kapil Chhabra, filed Jul. 3, 2008, 22 pages.
International Search Report for corresponding PCT Application No. PCT/US2008/069185, mailed Sep. 3, 2008, 1 page.
Written Opinion for corresponding PCT Application No. PCT/US2008/069185, mailed Sep. 3, 2008, 1 page.
Office Action issued in U.S. Appl. No. 11/867,661, mailed Jun. 11, 2010, 28 pages.
Notice of Allowance issued in U.S. Appl. No. 11/867,665, mailed Sep. 2, 2011, 11 pages.
Office Action issued in Japanese Application No. 2009-532521, dated Feb. 7, 2012, 4 pages, including English language translation.
Notice of Allowance issued in U.S. Appl. No. 11/867,665, mailed Feb. 10, 2012, 11 pages.
Office Action issued in U.S. Appl. No. 11/800,166, mailed Apr. 20, 2012, 47 pages.
Third Office Action issued in Chinese Application No. 200780038678.7, dated Apr. 28, 2012, 2 pages, English language translation.
Notice of Allowance issued in U.S. Appl. No. 11/542,393, mailed May 14, 2012, 45 pages.
Notice of Allowance issued in U.S. Appl. No. 11/800,166, mailed Aug. 14, 2012, 19 pages.
Office Action issued in U.S. Appl. No. 11/867,661, mailed Sep. 5, 2012, 33 pages.
Office Action issued in Japanese Application No. 2009-532521, dated Sep. 18, 2012, 3 pages, English language summary and translation.
Notice of Allowance issued in U.S. Appl. No. 12/167,804, mailed Sep. 26, 2012, 16 pages.
Notice of Allowance issued in U.S. Appl. No. 11/800,166, mailed Feb. 22, 2013, 6 pages.
Notice of Allowance issued in U.S. Appl. No. 12/167,804, mailed Mar. 19, 2013, 15 pages.
Notice of Allowance issued in U.S. Appl. No. 11/800,166, mailed May 21, 2013, 7 pages.
Extended European Search Report in corresponding European Application No. 07853857.6, dated Nov. 28, 2013, 9 pages.

* cited by examiner

SYSTEM AND METHOD FOR GAMING IN AN AD-HOC NETWORK

CROSS REFERENCE TO RELATED APPLICATIONS

This patent claims the priority benefit under 35 U.S.C. §119(e) of U.S. provisional patent application Ser. No. 60/862,898, filed on Oct. 25, 2006, titled "GAMING USING MARVELL AIMM", the content of which is incorporated in its entirety herein by reference for all purposes.

This patent is related to copending U.S. patent application Ser. No. 11/867,665 (MP1382), filed on Oct. 4, 2007, entitled "POWER SAVE MECHANISMS FOR DYNAMIC AD-HOC NETWORKS," and U.S. patent application Ser. No. 11/867,661 (MP1381), filed on Oct. 4, 2007, entitled "AUTOMATIC AD-HOC NETWORK CREATION AND COALESCING USING WPS," the contents of which are incorporated herein by reference for all purposes.

BACKGROUND

Wireless fidelity (Wi-Fi) networks are utilized to exchange information in both personal and corporate environments. One known Wi-Fi standard, the Wireless Local Area Network (WLAN) standard, specifies and details the set up, communications and the configuration protocols for an infrastructure WLAN.

Figure 1:
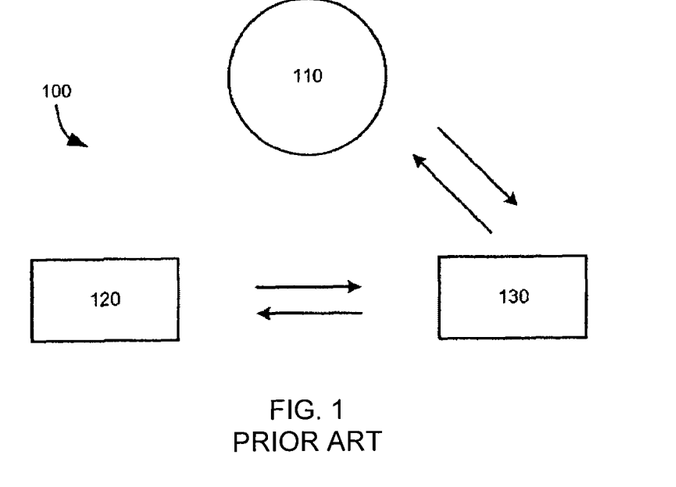
FIG. 1 illustrates an embodiment of a known infrastructure network.

FIG. 1 illustrates an exemplary configuration of a known infrastructure WLAN 100. The infrastructure WLAN 100 includes three logical components or elements: an access point 110; a registrar 120, and a client 130. In operation, the client 130 will query or communicate with the registrar 120 via, for example, an IEEE 802.11x (802.11a, 802.11b, 802.11g . . . 802.11n, 802.11x) network, in an attempt to acquire network or communications credentials. Upon receipt of the network credentials, the client 130 establishes a communications link to access point 110. In alternate embodiments, the registrar 120 may be a portion or subsystem of the access point 110 and/or may be in communication with the access point 110.

Ad-hoc networks may be established in place of the infrastructure WLAN 100. Ad-hoc networks allow a client to establish an arbitrary and/or temporary network with one or more additional clients within a given communications area or range. Thus, ad-hoc networks provide configuration and operational flexibility to allow clients and/or devices that enter into communication range with each other to be configured to share information. It would be desirable to establish the communications link between the clients and/or devices in a seamless manner. Moreover, it would be desirable to allow for real-time or near real-time communications in order to quickly share and/or distribute time-sensitive information. It would further be desirable to implement interactive games or strategy simulations between one or more users and/or wireless devices within communications range of each other.

SUMMARY

The present disclosure generally relates to wireless communications between mobile devices, and more particularly to games and gaming between wireless devices in an ad-hoc network.

In one embodiment, a method of mobile gaming is disclosed. The method includes configuring a mobile device to include a plurality of gaming parameters representative of a game to be played, communicating a gaming request via a wireless network, wherein the gaming request includes a game identifier. The method further includes detecting a gaming request response, wherein the gaming request response is associated with the game identifier, exchanging at least one of the plurality of gaming parameters, and updating at least one of the plurality of gaming parameters on the mobile device to reflect the exchanged at least one of the plurality of gaming parameters.

In another embodiment, a method of mobile gaming is disclosed. The method includes configuring a first mobile device to include a first plurality of gaming parameters representative of a game to be played, configuring a second mobile device to include a second plurality of gaming parameters representative of the game to be played, detecting the presence of the first mobile device within a communications range of the second mobile device, exchanging at least one of the first and second plurality of gaming parameters between the first and second mobile devices, and updating at least one of the first and second plurality of gaming parameters on the first and second mobile devices.

In another embodiment, a mobile device for gaming is disclosed. The mobile device includes a controller configured to store a plurality of gaming parameters representative of a game to be played, a transmitter configured to broadcast a gaming request via a wireless network, wherein the gaming request includes a game identifier, and a receiver configured to detect a gaming request response, wherein the gaming request response is associated with the game identifier. The controller portion of the mobile device is configured to exchange at least one of the plurality of gaming parameters in response to the gaming request response, and update at least one of the plurality of gaming parameters to reflect the exchanged at least one of the plurality of gaming parameters.

Additional features and advantages of the present invention are described in, and will be apparent from, the following Detailed Description and the figures.

DETAILED DESCRIPTION

Figure 2:
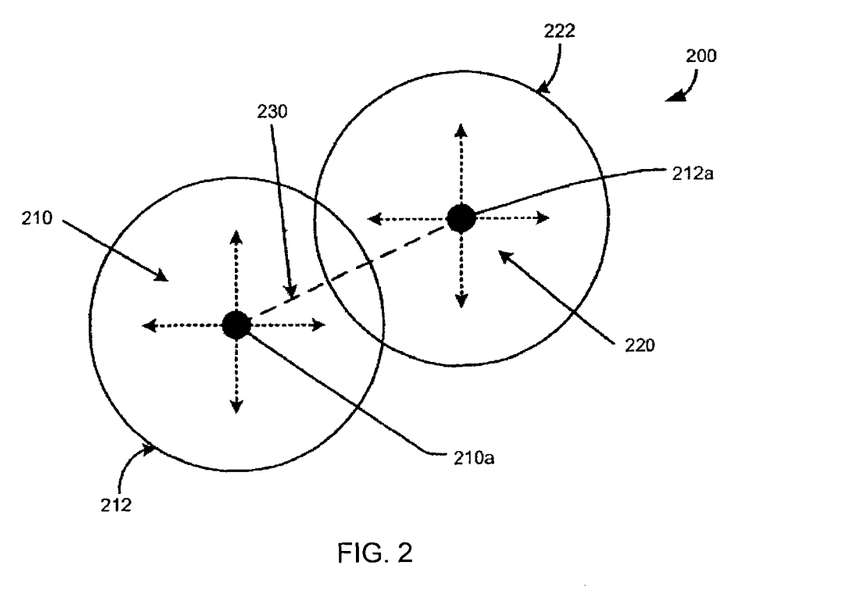
FIG. 2 illustrates an embodiment of an ad-hoc network that may be implemented in conjunction with the disclosure provided herein.

FIG. 2 illustrates another embodiment of a wireless network that may be established without the logical components illustrated in FIG. 1. The wireless network of FIG. 2 is referred to as an ad-hoc network 200. The ad-hoc network 200 does not include an access point 110 and may be established directly between wireless devices 210 and 220. For example, the wireless devices 210 and 220 are free roaming and randomly movable devices each having a communications range 212, 222, respectively. When the wireless devices 210, 220 are in range of each other, as shown in FIG. 2, a communications link 230 may be established directly between each device. The communications link 230 forms the basis for the ad-hoc network 200 and allows for the exchange of information without the need for an access point 110 or additional hardware. Alternate configurations and arrangements of ad-hoc networks are discussed and disclosed in U.S. patent application Ser. No. 11/867,661 (MP1381), filed on Oct. 4, 2007, entitled "AUTOMATIC AD-HOC NETWORK CREATION AND COALESCING USING WPS," the contents of which is incorporated herein by reference for all purposes.

Exemplary techniques for establishing the ad-hoc network 200 are discussed and disclosed herein. For example, the wireless device 210 may be configured to transition between an awake (active) mode and a sleep (inactive) mode during periods defined as beacon intervals. The beacon interval may be defined as a basic unit of time during which the wireless devices 210, 220 are operational. Beacon intervals may be further divided into: (1) an awake subinterval during which the wireless device is either transmitting a network connection request or listening for network activity; and (2) a sleep subinterval during which the network device is conserving power by not transmitting or receiving network messages. Before the communication link 230 or network connection is established and while awake or active, the wireless device 210 transmits or broadcasts a beacon, probe or network connection request and also listens for network activity and/or a network connection response or response beacon from, for example, the wireless device 220 if it is within the communication range 212. If a response beacon or response message is not detected while the wireless device 210 is listening, the wireless device 210 enters the sleep (inactive) mode to conserve power.

In an alternate embodiment, the wireless device 210 may alter the length and occurrence of the awake (active) mode relative to the start of each beacon interval. In another alternate embodiment, the beacon or network connection request and/or the network connection response or response beacon can be configured to include network or device information, data, etc., specific to the transmitting or broadcasting device, for example, the wireless device 210 in the example discussed above. In some embodiments, the information may include an OSI (open systems interconnection) Layer 2 address of the wireless device 210 such as a media access control (MAC) address. Different or additional information elements such as PIN codes and security credentials may also be included as part of the network connection request or probe.

Figure 3:
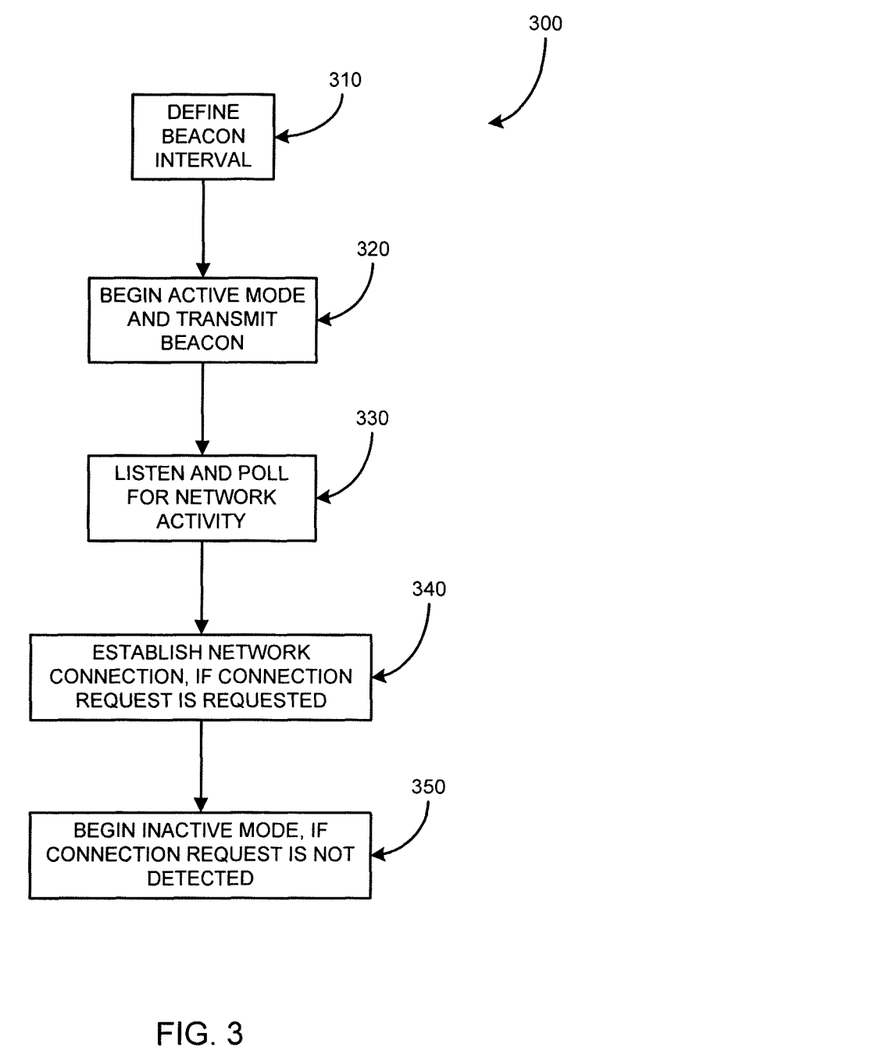
FIG. 3 illustrates a flowchart representative of one embodiment of an ad-hoc network connection methodology.

FIG. 3 illustrates an embodiment of a communication sequence 300 which may be implemented by the wireless devices 210, 220. The embodiment of the communication sequence 300 discussed herein refers to the wireless device 210, however it will be understood that additional wireless devices 220, etc. may utilize the disclosure and teaching provided herein when establishing the ad-hoc network 200.

At block 310, a beacon interval may be defined for the wireless device 210. The beacon interval represents a basic unit of time measurement within the communication sequence 300. As previously discussed, the beacon interval may be divided into an awake or active interval and a sleep or inactive interval. The awake or active interval may be further described as the "sniff subinterval" or "sniff interval." The sniff subinterval or sniff interval represents the portion or period within the beacon interval during which the wireless device 210 is transmitting a beacon, probe or network connection request, or listening for network activity. In one embodiment, the beacon interval may be equally subdivided into a plurality of subintervals. Thus, the sniff subinterval or sniff interval may occur regularly within the beacon interval and may span one or more of the equal subintervals. An exemplary beacon interval may have a duration of approximately one hundred milliseconds (100 ms) or may be configured to conform to any network requirements and/or application-specific criteria.

At block 320, the wireless device 210 transitions to the awake or active mode during the predefined or established sniff subinterval. During the sniff subinterval the wireless device transmits a beacon, probe or other message to any device within the communication range 212. As previously discussed, the beacon operates or acts as a network connection request and may be generated by the wireless device 210 operating as a network registrar 120 or equivalent. Alternatively, the beacon may be a probe request generated by, for example, the client or wireless device 210 searching for the registrar 120 which may be, in this example, the wireless device 220.

At block 330, the wireless device 210, operating within the sniff subinterval, listens or polls the communication range 212 in an attempt to identify network activity. It will be understood that the steps, process and/or functionality discussed in conjunction with blocks 320 and 330 may be performed serially as disclosed herein. Alternatively, the steps, processes and/or functionality discussed in conjunction with blocks 320 and 330 may be performed in parallel or reordered such that block 330 (listening) is performed before block 320 (transmitting or broadcasting). In one exemplary embodiment, the duration or period of the sniff subinterval may be approximately three point two milliseconds (3.2 ms).

At block 340, the wireless device 210 may establish a communications link 230 or network connection with a device, for example, the wireless device 220, within the communication range 212. For example, the wireless device 210, while listening for network activity or beacons, may detect a network connection request transmitted by another device, for example the wireless device 220. The network connection request may represent a beacon generated by the wireless device 220 or it may represent a response to the beacon transmitted by the wireless device 210. In one embodiment, the wireless device 220 may detect the beacon transmitted at block 320 during one of the preceding beacon intervals and may have transmitted a response. The response, in turn, may be detected by the wireless device 210 during the current or active sniff subinterval defined within the beacon interval. This challenge/response and/or handshake procedure provides a framework upon which the communication link 230 may be established.

Alternatively, at block 350, if a network connection request and/or a response is not detected, the wireless device 210 may enter the sleep or inactive mode. In an exemplary embodiment, the wireless device 210 may operate in the sleep or inactive mode for more than ninety percent (90%) of each beacon interval in order to, for example, conserve power. Alternative power conservation methods and scenarios are disclosed and discussed in copending U.S. patent application Ser. No. 11/867,665 (MP1382), filed on Oct. 4, 2007, entitled "POWERS SAVE MECHANISMS FOR DYNAMIC AD-HOC NETWORKS," the content of which is incorporated herein by reference for all purposes.

Figure 4A:
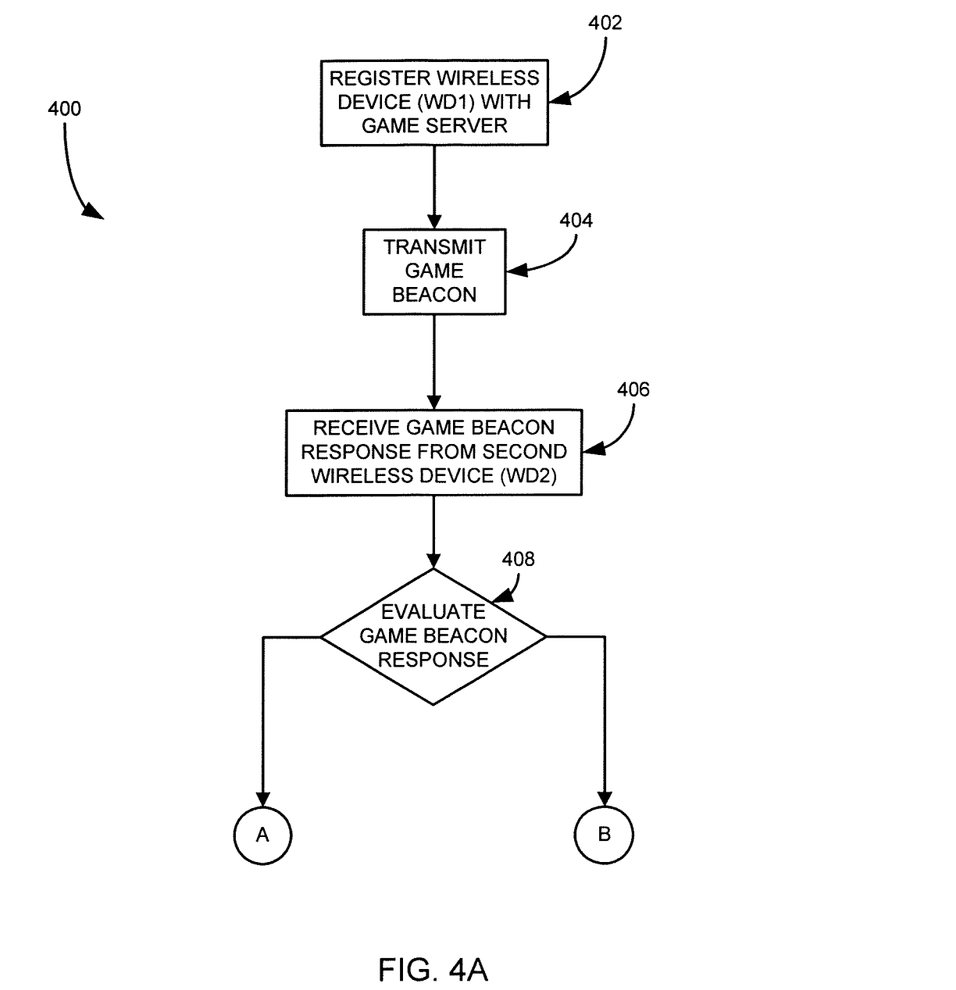
FIGS. 4A to 4C illustrate gaming flowcharts in accordance with the teaching disclosed herein.
Figure 4B:
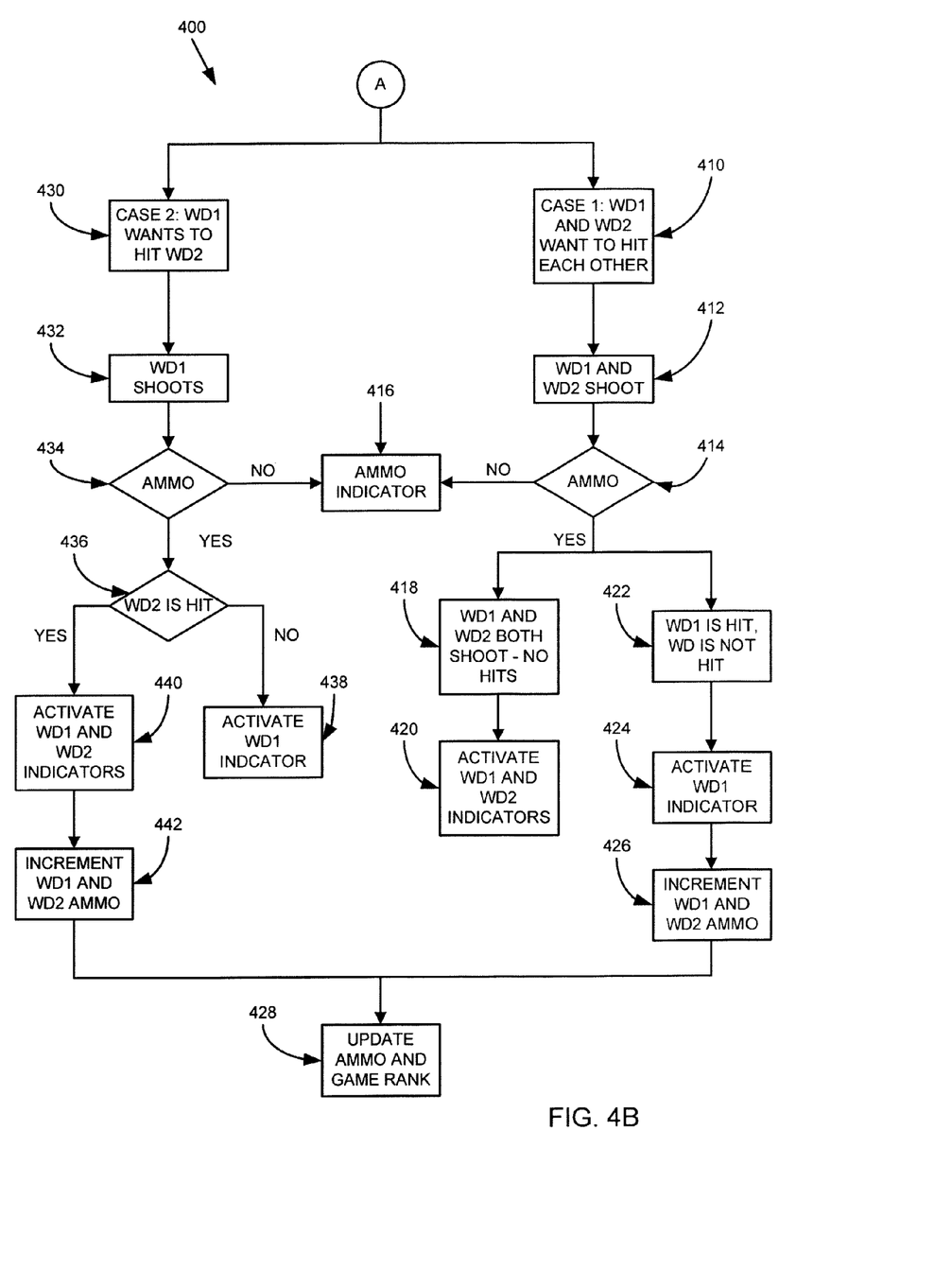
Figure 4C:
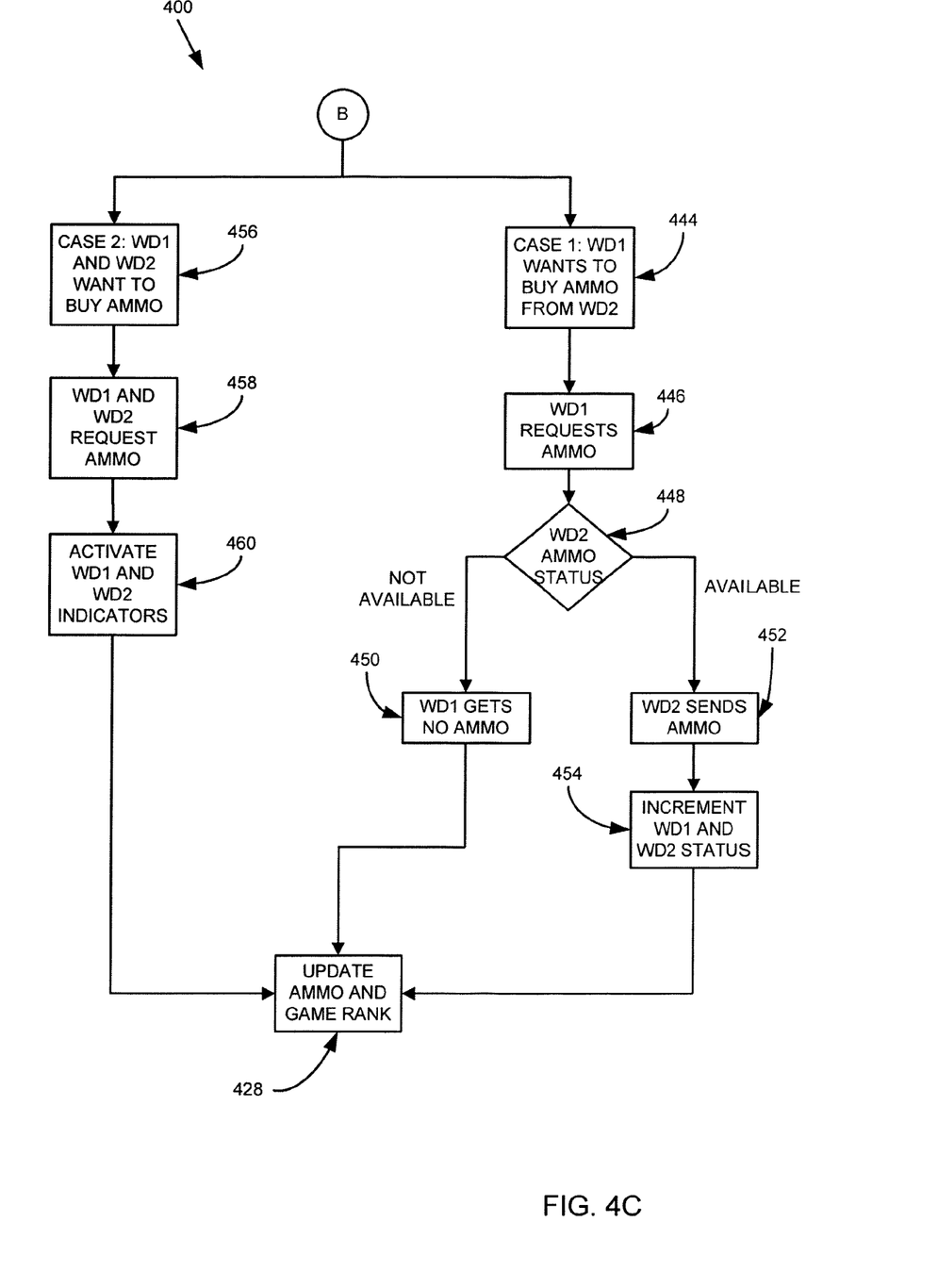

FIGS. 4A to 4C illustrate a gaming scenario 400 for an exemplary game that may be implemented between wireless devices 210, 220 such as, for example, MARVELL® AIMM Keys and/or other wireless LAN (WLAN) transceivers which utilize a single button and may provide a basic LAN connection and transmission of information packets. The wireless devices 210, 220 may be configured for and/or operative within the ad-hoc network 200. The gaming scenario 400 allows for interactive game play between at least the wireless devices 210, 220. For example, the wireless device 210 may be operating according to a first beacon interval while the wireless device 220 may be operating according to a second beacon interval. The first and second beacon intervals may have different starting points and therefore different sniff subintervals. The gaming scenario 400 provides for exchanging information via the communications link 230 between the wireless devices 210, 220 operating according to different beacon intervals, e.g., different active and inactive modes.

The gaming scenario 400 is configured and designed to provide an equal chance of success for the wireless devices 210, 200 by compensating for the different beacon intervals. For example, the wireless devices 210, 200 can begin to exchange information such as, for example, "shooting" at each other, only after both users of the wireless devices 210, 200 have joined the game and have been informed that a competitor or "enemy" has been "sighted" or is within the communication range 212, 222. In one embodiment, compensation may include delaying a user indication of a received network connection request until after a network connection response or acknowledgement is communicated. For example, if the wireless device 210 receives a probe or network communication request from the wireless device 220 an indicator on the wireless device 210 may not be activated until after a probe acknowledgement or network communication response has been transmitted to the wireless device 220. In this way, both user's of the wireless devices 210, 220 can be alerted simultaneously or near-simultaneously to ensure that both users get a sighting of the "enemy" at roughly the same time. Delays which may be caused by the different timing of the beacon intervals and/or the sniff subintervals of the wireless devices 210, 220 can be addressed by delaying the user indication by a time period equal to the difference between the two sniff subinterval starting points.

Returning to FIG. 4A, at block 402, the wireless device 210 connects or communicates with a game server (not shown) via a network such as, for example, the ad-hoc network 200, the Internet (not shown), an intranet (not shown) or any other communications medium. The wireless device 210 further registers with the game server to play, in this exemplary embodiment, the "Mafia Game." Registration of the wireless device 210 includes, for example, being assigned: (1) an ammunition amount, A_1; (2) an amount of money, M_1; (3) a player rank, R_1; and (4) a gang, G_1. In this example, the player rank, R_1 indicates the most junior rank and more senior ranks, e.g., R_2, R_3, etc. may be earned through game play. Similarly, larger amounts of money, ammunition, etc. may be earned, assigned or gathered through additional game play.

At block 404, the wireless device 210, now registered and ready to play the Mafia Game, transmits or broadcasts a game beacon or other network communication request. The game beacon announces to other devices within the communication range 212 the presence of a wireless device 210 configured to play the Mafia Game. In one embodiment, the game beacon may include a Service Set Identifier (SSID) such as, for example, "Mafia" and a gang identifier such as, for example, the assigned gang G_1. During the transmission or broadcast of the game beacon a light emitting diode (LED) may be triggered to indicate the transmission.

At block 406, the wireless device 210 may receive a game beacon or a game beacon response from the wireless device 220 within the communication range 212. The received game beacon or game beacon response may include the Mafia SSID, and a gang identifier G_2. It will be understood that the wireless device 220 may be configured to include (1) an ammunition amount, A_2; (2) an amount of money, M_2; (3) a player rank, R_1; and (4) a gang, G_2. In response to the exchanged beacons, the communications link 230 may be established between the two wireless devices 210, 220.

At block 408, the gang identifiers G_1 and G_2 are evaluated by each of the wireless devices 210, 220. If the gang identifiers G_1 and G_2 represent different gangs or teams, then the game scenario proceeds towards block A. If the gang identifiers G_1 and G_2 represent the same gang or team, then the game scenario proceeds towards block B.

Referring to FIG. 4B, blocks 410 and 430 represent different cases or contingencies that can occur based on the user actions provided to wireless device 210 and/or wireless device 220. At block 410, representing case one, both wireless devices 210, 200 receive an indication that they are part of different gangs G_1 and G_2.

At block 412, in response to this indication, the users of the wireless devices 210, 220 both attempt to shoot each other. The communications between the wireless devices 210, 220 can be processed and/or delayed in any manner discussed above in order to compensate for communications lags in the ad-hoc network 200 and/or between the differences in beacon intervals.

At block 414, the ammunition assigned to each of the wireless devices 210, 220 is evaluated. If either device does not have enough ammunition, e.g., if either A_1 or A_2 is low or empty, then at block 416 the ammo indicator of the appropriate device 210, 220 is triggered to notify the user(s) that they cannot fire. For example, a yellow LED may be activated and blink slowly.

At block 418, assuming sufficient ammunition, the users may shoot at each other. In particular, both wireless devices 210, 220 shoot at each other, but fail to hit each other.

At block 420, the misses registered by both of the wireless devices 210, 220 are recorded and/or stored. Moreover, indicators on both of the wireless devices 210, 200 may be triggered. For example, an LED on each of the wireless devices 210, 220 can be flashed slowly to signify a missed shot.

At block 422, assuming sufficient ammunition, the game scenario 400 indicates that the wireless device 210 is "hit" in response to the "shot" fired by the wireless device 220.

At block 424, the hit is registered with the wireless device 210 and an indicator is activated to inform the user. The indicator, as discussed above, could be a steady glowing LED, a vibrating mechanism and/or text and graphics on a display screen.

At block 426, the ammunition amounts A_1 and A_2 associated with the wireless devices 210, 200 are updated. For example, the ammunition amount A_1 associated with wireless device 210 (the device that was hit in the exchange) may be decreased by two shots. Similarly, the ammunition amount A_2 associated with wireless device 220 (the device that was not hit in the exchange) may be decreased by a single shot. In this instance, the user of the wireless device 210 is penalized by losing ammunition by being hit in the exchange.

At block 428, the ammunition amount A_1, A_2 and player rank R_1, R_2 for the wireless devices 210, 220 can be updated to reflect the results of the information exchange, e.g., the exchange of "shots."

Returning to block 430, representing case two, the wireless device 210 receives an indication that the wireless device 220 is part of a different gang G_2. The user of wireless device 210 decides to engage and shoot the wireless device 220 in the rival gang G_2.

At block 432, in response to this indication, the user of the wireless device 210 shoots at the wireless device 220. As previously discussed, the communications between the wireless devices 210, 220 can be processed and/or delayed in any manner discussed above in order to compensate for communications lags in the ad-hoc network 200 and/or between the differences in beacon intervals.

At block 434, the ammunition assigned to the wireless device 210 is evaluated. If the device does not have enough ammunition, e.g., if A_1 is low or empty, then at block 416 the ammo indicator of the wireless device 210 is triggered to notify the user that they cannot fire. For example, a yellow LED may be activated and blink slowly.

At block 436, the status of the shot from wireless device 210 to the wireless device 220 is evaluated. If the shot misses, then at block 438 the indicator coupled to the wireless device 210 is triggered. For example, a yellow LED on the wireless device 210 can be activated to blink slowly. If the shot hits or connects with the wireless device 220, then at block 440 the indicator coupled to the wireless devices 210, 220 are triggered. For example, a blue LED on the wireless device 210 can be activated to blink slowly and a red LED on the wireless device 220 can be activated.

At block 442, the ammunition amounts A_1 and A_2 associated with the wireless devices 210, 200 are updated. For example, the ammunition amount A_1 associated with wireless device 210 (the device that successfully shot) may be increased by one shot. Similarly, the ammunition amount A_2 associated with wireless device 220 (the device that was hit in the exchange) may be decreased by a single shot. In this instance, the user of the wireless device 220 is penalized by losing ammunition for being hit in the exchange and the user of the wireless device 210 is rewarded with extra ammunition.

At block 428, the ammunition amount A_1, A_2 and player rank R_1, R_2 for the wireless devices 210, 220 can be updated to reflect the results of the information exchange, e.g., the exchange of shots.

Referring to FIG. 4C, blocks 444 and 456 represent different cases or contingencies that can occur based on the user actions provided to wireless device 210 and/or wireless device 220. At block 444, representing case one, both wireless devices 210, 200 receive an indication that they are part of the same gang (G_1 equals G_2). In this case, the wireless device 210 may wish to acquire ammunition from wireless device 220.

At block 446, the wireless device 210 communicates a request to the wireless device 220 via the communications link 230. The request may include, for example, an ammunition amount, a monetary amount or any other pertinent transaction information.

At block 448, the ammunition status of the wireless device 220 is evaluated to determine if additional ammunition is available for sale. If the wireless device 220 has no ammunition to sell, then at block 450 the wireless device 210 does not receive the requested ammunition. An indicator such as, for example, a yellow LED, on the wireless device 210 can be activated. Subsequently, at block 428, the ammunition amount A_1, A_2 and player rank R_1, R_2 for the wireless devices 210, 220 can be updated to reflect the results of the information exchange.

However, if the wireless device 220 has ammunition to sell, then at block 452 the wireless device 210 receives the requested ammunition or information representative of the requested ammunition.

At block 454, the ammunition amounts A_1 and A_2 associated with the wireless devices 210, 200 are updated. For example, the ammunition amount A_1 associated with wireless device 210 increases, while the ammunition amount A_2 associated with wireless device 220 decreases by an equal amount. Indicators such as, for example, a blue LED, on both of the wireless devices 210, 200 may be activated to show that the transaction was complete.

At block 428, the ammunition amount A_1, A_2 and player rank R_1, R_2 for the wireless devices 210, 220 can be updated to reflect the results of the information exchange.

Returning to block 456, representing case two, the wireless devices 210, 220 want to purchase or trade with each other.

At block 458, the wireless devices 210, 220 communicate ammunition requests to each other via the communications link 230. The requests may include, for example, an ammunition amount, a monetary amount or any other pertinent transaction information.

At block 460, neither wireless device 210 nor wireless device 220 receives additional ammunition from the other device. Indicators on each of the devices 210, 200 may be activated. For example, a yellow LED on each of the devices can be triggered to blink slowly.

At block 428, the ammunition amount A_1, A_2 and player rank R_1, R_2 for the wireless devices 210, 220 can be updated to reflect the results of the information exchange.

Figure 5:
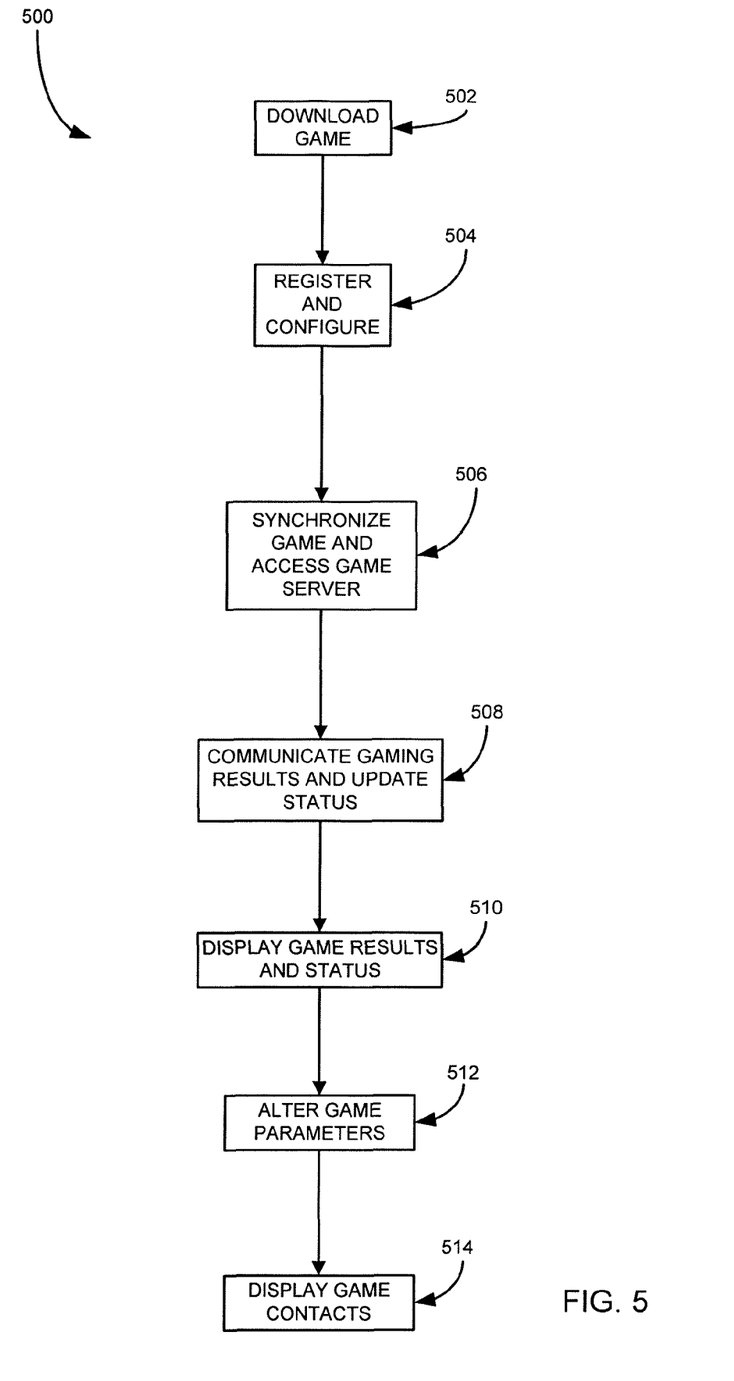
FIG. 5 illustrates a server-based game flowchart in accordance with the teaching disclosed herein

FIG. 5 illustrates a server-based gaming scenario 500 in accordance with the teaching disclosed herein. The server-based gaming scenario 500 may operate in conjunction with and/or as an extension of the gaming scenario 400. The server-based gaming scenario 500 illustrates how the Mafia Game discussed in conjunction with FIGS. 4A to 4C can be continued and played on a personal computer, server or in another virtual environment.

At block 502, a user may download the Mafia Game, or any other game that may be implemented via the ad-hoc network 200 and wireless devices 210, 220 as well as on a client personal computer (not shown).

At block 504, the user registers with a game server (not shown) via a network such as, for example, the ad-hoc network 200, the Internet (not shown), an intranet (not shown) or any other communications medium. The registration process communicates the game parameters necessary to configure, for example, the wireless device 210. The game parameters may include: (1) an ammunition amount, A_1; (2) an amount of money, M_1; (3) a player rank, R_1; and (4) a gang, G_1.

At block 506, the user may synchronize the wireless device 210 which may be, for example, the MARVELL® AIMM Key, with the personal computer. The synchronization process communicates and exchanges information between the wireless device 210 and the web-server via, for example, the Internet.

At block 508, the synchronization between the personal computer, which now contains the information stored within the wireless device 210, and the web-server based version of the Mafia Game updates the ammunition and player rank gathered and consolidated at the block 428. The synchronization may further update the ammunition and rank of user's in other gangs which the wireless device 210 encountered during a game playing session.

At block 510, the client version of the game which is executed by the personal computer can create and display user information such as, for example, ammunition, number of hits, players hit, player rank, etc.

At block 512, the user may alter the player status or parameters for the game. For example, if ammunition has been purchased from other players during the course of the day, the player providing the ammunition must be paid. Thus, the user may pay a debt based on the money M_1 allocated during the registration processor or earned during the gaming session. Alternatively, the money M_1 may be utilized to increase or buy a higher player rank, for example, to move from rank R_1 to R_2 by paying a fellow gang member, e.g., another person in the gang G_1 from the example above. In yet another alternative, the user may switch gangs from, for example, gang G_1 to gang G_3. For example, players can negotiate the switch based on rank and rank points in an attempt to increase their standing in the new gang.

At block 514, the client version of the game which is executed by the personal computer can create and display a contact list. The contact list may detail the player interaction during the course of a gaming session. Moreover, a graphical depiction of the interaction may be created to detail the contacts between individuals, gangs, etc.

The above gaming strategy provides an example of how a simple WLAN transceiver can be utilized to participate in an interactive game between peers associated with the ad-hoc network 200. It will be understood that other gaming scenarios and strategies may be created and/or adapted to utilize the functionality provided by the WLAN transceiver described and discussed above. Moreover, the MARVELL® AIMM Key is an example of a simple WLAN transceiver. The WLAN transceiver in this example includes a single button and is configured to transmit and receive information and information packets.

The disclosed system and gaming strategy illustrate an exemplary interactive gaming scenario that utilizes a simple WLAN transceiver. The WLAN transceiver may be utilized in stand-alone gaming strategies as described above, or may be implemented and integrated in larger and/or existing gaming consoles to further enhance the gaming experience. Regardless of the precise implementation, the WLAN transceiver may be utilized to augment and enhance a user's gaming experience.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A method of mobile gaming for a mobile device, the mobile device configured to include a plurality of gaming parameters representative of a game to be played, the method comprising:
   communicating a gaming request from a first mobile device to a second mobile device in order to create an ad-hoc wireless network, wherein the gaming request includes a game identifier;
   detecting a gaming request response from the second mobile device, wherein the gaming request response is associated with the game identifier;
   determining a difference of a display of a user indication for a game play based on a first wireless beacon signal of the first mobile device and a second wireless beacon signal of the second mobile device, wherein the difference of the display of the user indication for the game play corresponds to a difference in receiving the first wireless beacon signal of the first mobile device and the second wireless beacon signal of the second mobile device; and
   modifying a game playing sequence to include at least a delay of the display of the user indication on at least one of the first mobile device or second mobile device based on the determined difference, the delay reducing the determined difference of the display of the user indication for the game play.

2. The method of claim 1 further comprising:
   exchanging at least one gaming parameter of the plurality of gaming parameters.

3. The method of claim 2 wherein modifying the game playing sequence comprises:
   updating an indicator of at least one gaming parameter of the plurality of gaming parameters on the first mobile device to reflect the at least one exchanged gaming parameter,
   wherein the updating is delayed to reduce the difference of the display of the user indication for the game play.

4. The method of claim 1, wherein the ad-hoc wireless network is configured to communicate with a network selected from the group consisting of: a cellular network; a wireless fidelity network and a personal area network.

5. The method of claim 1, wherein the gaming request response is generated in response to the communicated gaming request.

6. The method of claim 2, wherein exchanging at least one gaming parameter of the plurality of gaming parameters includes exchanging a player parameter and a game parameter.

7. The method of claim 1, wherein the gaming request includes a service set identifier (SSID).

8. The method of claim 2 further comprising:
   analyzing the at least one exchanged gaming parameter to determine how to play the game.

9. The method of claim 1, wherein the delay is equal to the difference between the first wireless beacon signal and the second wireless beacon signal.

10. A method of mobile gaming for a first mobile device configured to include a first plurality of gaming parameters representative of a game to be played and a second mobile device configured to include a second plurality of gaming parameters representative of a game to be played, the method comprising:
    detecting the presence of the first mobile device within a communications range of the second mobile device in order to create an ad-hoc wireless network;
    exchanging at least one gaming parameter of the first and second plurality of gaming parameters between the first and second mobile devices;
    determining a difference of a display of a user indication for a game play based on a first wireless beacon signal and a second wireless beacon signal of the first and second mobile devices, wherein the difference of the display of the user indication for the game play corresponds to a difference in receiving the first wireless beacon signal of the first mobile device and the second wireless beacon signal of the second mobile device; and
    modifying a game playing sequence to include at least a delay of the display of the user indication on at least one of the first mobile device or second mobile device based on the determined difference, the delay reducing the determined difference of the display of the user indication for the game play.

11. The method of claim 10 further comprising:
    communicating a gaming request in order to create the ad-hoc wireless network, wherein the gaming request includes a game identifier.

12. The method of claim 10 further comprising:
    detecting a gaming request response, wherein the gaming request response is associated with the game identifier.

13. The method of claim 10, wherein detecting the presence of the first mobile device includes detecting a communicated gaming request provided by the first mobile device.

14. The method of claim 10 wherein modifying the game playing sequence comprises:
    updating an indicator of at least one gaming parameter of the first and second plurality of gaming parameters on the first and second mobile devices to reflect the at least one exchanged gaming parameter,
wherein the updating is delayed to reduce the difference of the display of the user indication for the game play.

15. The method of claim 14 further comprising:
changing the status of the indicator to reflect at least one of the first plurality of gaming parameters.

16. The method of claim 10, wherein the communication range of the second mobile device is associated with the ad-hoc wireless network configured to communicate with a network selected from the group consisting of: a cellular network; a wireless fidelity network and a personal area network.

17. A mobile device for gaming comprising:
a controller configured to store a plurality of gaming parameters representative of a game to be played;
a transmitter configured to broadcast a gaming request in order to create an ad-hoc wireless network, wherein the gaming request includes a game identifier;
a receiver configured to detect a gaming request response, wherein the gaming request response is associated with the game identifier;
wherein the controller is configured to:
determine a difference of a display of a user indication for a game play based on a first wireless beacon signal of the mobile device and a second wireless beacon signal of another mobile device, wherein the difference of the display of the user indication for the game play corresponds to a difference in receiving the first wireless beacon signal of the first mobile device and the second wireless beacon signal of the another mobile device; and
modify a game playing sequence to include at least a delay of the display of the user indication on at least one of the mobile device or the another mobile device based on the determined difference, the delay configured to reduce the difference of the display of the user indication for the game play.

18. The device of claim 17, wherein the receiver is configured to detect the presence of the another mobile device within a communications range of the receiver.

19. The device of claim 17, wherein the controller is further configured to exchange at least one gaming parameter of the plurality of gaming parameters in response to the gaming request response.

20. The device of claim 19, wherein the controller is further configured to update an indicator to reflect the at least one exchanged gaming parameter.

21. The device of claim 20, wherein the controller is further configured to:
delay the update of the indicator to reduce the difference of the display of the user indication for the game play.

* * * * *